(12) United States Patent  
Thompson

(10) Patent No.: US 7,276,676 B1  
(45) Date of Patent: Oct. 2, 2007

(54) COMBINED FOOD AND FOOD-PLATE WARMING DEVICE

(76) Inventor: Jennifer J. Thompson, 201 N. Orange Grove Blvd., Pasadena, CA (US) 91103

( * ) Notice: Subject to any disclaimer, the term of this patent is extended or adjusted under 35 U.S.C. 154(b) by 0 days.

(21) Appl. No.: 11/344,709

(22) Filed: Feb. 2, 2006

(51) Int. Cl.  
*F27B 11/00* (2006.01)  
*A47J 39/00* (2006.01)

(52) U.S. Cl. ............... 219/439; 219/387; 219/429; 219/432; 219/428; 219/202; 219/433; 219/506; 219/521; 220/592.23; 206/550; 206/541; 206/545

(58) Field of Classification Search .............. 219/439, 219/202, 387, 433, 506, 521, 429, 432, 428; 392/444  
See application file for complete search history.

(56) References Cited

U.S. PATENT DOCUMENTS

| | | | |
|---|---|---|---|
| 4,458,139 A | 7/1984 | McClean | |
| 5,274,215 A * | 12/1993 | Jackson | 219/439 |
| 5,481,962 A | 1/1996 | Tedesco | |
| 5,497,883 A | 3/1996 | Monetti | |
| D418,009 S | 12/1999 | Banc | |
| 6,085,930 A * | 7/2000 | Curtis | 220/371 |
| 6,144,016 A * | 11/2000 | Garvin | 219/387 |

* cited by examiner

*Primary Examiner*—Shawntina Fuqua

(57) ABSTRACT

A food and food-plate warming device includes a base plate that has a planar top surface and has an outwardly beveled edge provided with laterally stepped ridges concentrically spaced from the top surface center. A cover plate is positioned on the base plate and has an outer lip that is nested on one of the stepped ridges. Handles are conjoined to the outer lip for receiving at least four contiguous metacarpals therethrough. A mechanism is included for heating the base plate top surface such that the food and food-plate interfitted between the base plate and the cover plate can be heated. The heating mechanism includes a heating element intercalated between the top and bottom surfaces of the first base plate. An automatic shut off switch is coupled to the heating element for interrupting power to the heating element when an interior temperature of the device reaches a maximum threshold temperature.

12 Claims, 5 Drawing Sheets

COMBINED FOOD AND FOOD-PLATE WARMING DEVICE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to warming devices and, more particularly, to a combined food and food-plate warming device.

2. Prior Art

In the interest of saving money and conserving food, many persons will reheat food that was prepared one or two days prior to the event. This is especially true among the elderly, who tend to be on a much more limited budget than those who have a steady working income. In order to properly heat one's food the use of a conventional oven, a toaster oven or a microwave is required. The drawback of using a conventional oven is the fact that the interior volume thereof is so extensive that is becomes counter productive to heat a single plate of food therein. Conventional ovens also consume a lot of energy while in operation, thus resulting in money loss instead of money savings.

Although a toaster oven is ideal for heating bread and other such smaller food items, the interior of such ovens are generally too small to accommodate an entire plate of food at one time. This requires that the user either find an alternate method of heating their food, or that they heat small portions at intervals. Obviously, the later practice is time-consuming and ineffective, since while a second portion of food is being heated, the previously heated portion of food is cooling down again.

Microwave ovens provide convenient means for quickly heating various food items. Users have found, however, that when heating a large plate of food different food items heat up at different rates, depending on their water content. Thus, for example, a person's rice will heat up much faster than the piece of meat that is sitting next to it on the plate. A further drawback of modern ovens and microwave ovens is that they are becoming increasingly complicated to operate. Thus, some elderly persons who feel intimidated by the technologically advanced appliances may forgo even attempting to use one.

Accordingly, a need remains for a combined food and food-plate warming device in order to overcome the above-noted shortcomings. The present invention satisfies such a need by providing a food warming device that is convenient and easy to use, attractive in appearance, practical and effective in design, and durable. Such a warming device provides a way for the elderly who are arthritic, and other individuals, to safely prepare their own meals. The device conveniently eliminates the need for an elderly person to remember to shut off an appliance such as an oven or toaster oven after they are done using it. Such a food warming device is also ideal for those individuals who find the prospect of operating a microwave to be intimidating and complicated.

BRIEF SUMMARY OF THE INVENTION

In view of the foregoing background, it is therefore an object of the present invention to provide a combined food and food-plate warming device. These and other objects, features, and advantages of the invention are provided by a combined food and food-plate warming device for assisting arthritic users to simultaneously heat refrigerated foodstuff seated on a cold plate.

The combined food and food-plate warming device includes a first base plate that has an annular shape provided with a planar top surface. Such a base plate further has an outwardly beveled edge provided with a plurality of laterally stepped ridges concentrically spaced from a center of the top surface. The base plate includes a plurality of handles that are directly conjoined to the outwardly beveled edge and are diametrically spaced along an outer perimeter of the base plate. Such handles are suitably sized and shaped for receiving at least four contiguous metacarpals of the user therethrough.

A first cover plate is directly positioned on the base plate. Such a cover plate has an annular shape provided with an outer lip that is directly nested on top of an outer one of the stepped ridges such that heat and steam are advantageously and effectively prevented from escaping away from an interior of the warming device. The first base plate bottom surface and the first cover plate top surface have an oscillating pattern.

A mechanism is included for heating the top surface of the base plate in such a manner that the food and food-plate interfitted between the base plate and the cover plate can advantageously and effectively be heated after a predetermined time interval. Such a heating mechanism includes an enclosed housing that is removably abutted directly against the bottom surface of the base plate. The housing has a cavity formed therein and further has a plurality of access holes formed at opposed ends of the housing. A unitary and continuous heating element is disposed within the cavity such that the heating element is invisible to the user.

An automatic shut off switch is electrically coupled to the heating element for advantageously and conveniently interrupting power to the heating element when an interior temperature of the warming device reaches a maximum threshold temperature. A top surface of the housing and the bottom surface of the base plate define a plurality of gaps therebetween for advantageously and effectively allowing heat to circulate along an entire surface area of the base plate and evenly distribute heat therealong.

The device preferably further includes a second base plate and a second cover plate directly and removably conjoined therewith. Such a second base plate has a contoured and beveled bottom surface. The first cover plate has a contoured and beveled top surface that has a symmetrically opposite and mirror shape of the second base plate bottom surface respectively such that the second base plate and the first cover plate effectively become interlocked when vertically stacked on each other.

The device may further include a third base plate and a third cover plate directly and removably conjoined therewith. Such a third base plate has a contoured and beveled bottom surface. The second cover plate has a contoured and beveled top surface that has a symmetrically opposite and mirror shape of the third base plate bottom surface respectively such that the third base plate and the second cover plate become interlocked when directly engaged and adapted to a vertically stacked position.

The first, second and third top plates preferably include a plurality of concentrically positioned annular ridges centrally registered from a respective center of the first, second and third top plates. Each of the first, second and third top plates may also include a knob centrally conjoined thereto and protruding vertically upwards such that a longitudinal length of the knob is oriented perpendicular to a respective one of the first, second and third top plates. Each of the first, second and third base plates may be provided with a chamfered region defining a notch suitably sized and shaped for conveniently and effectively receiving the knobs therein when the first, second and third base and cover plates are vertically stacked respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
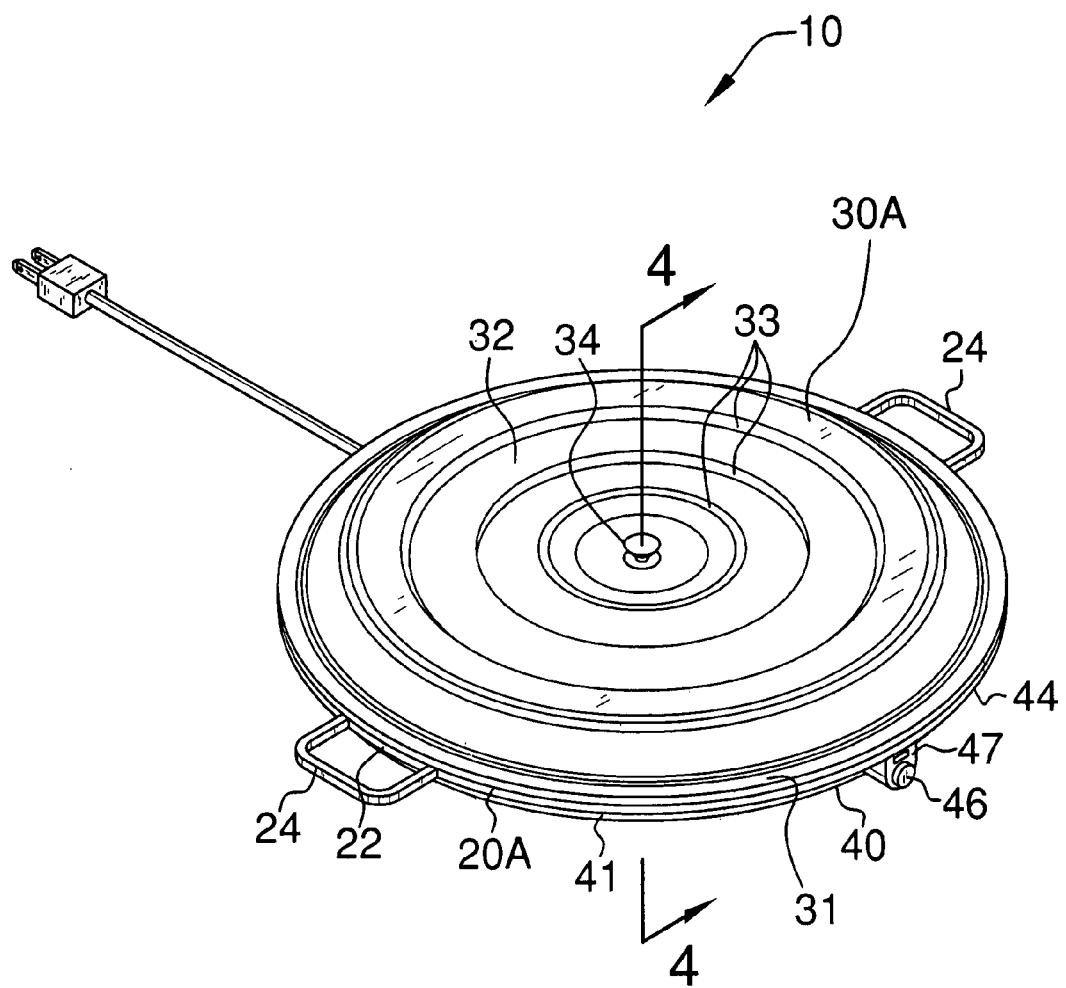
FIG. 1 is a perspective view showing a combined food and food-plate warming device, in accordance with the present invention.
Figure 2:
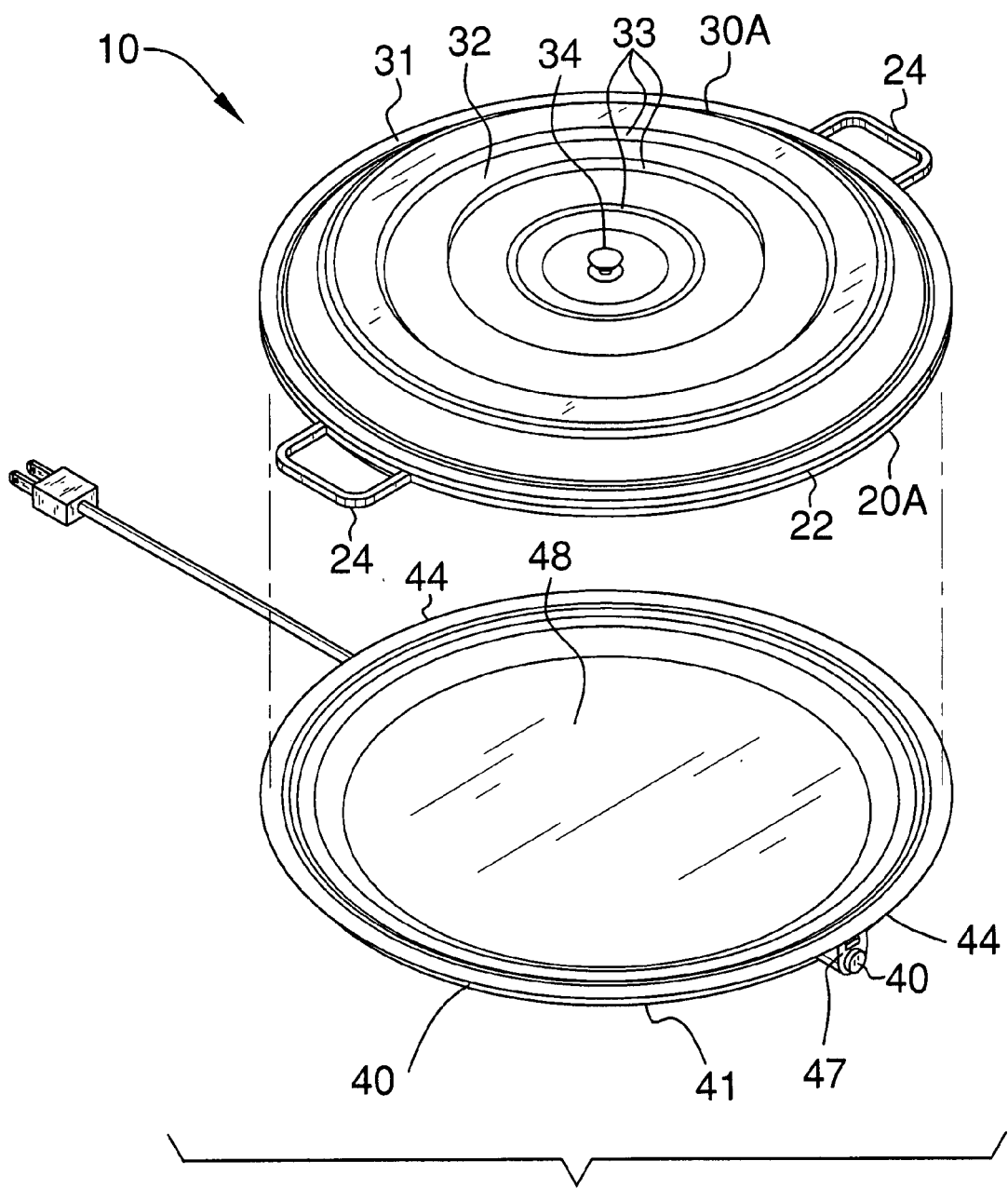
FIG. 2 is a partially exploded perspective view of the device shown in FIG. 1.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-7 by the reference numeral 10 and is intended to provide a combined food and food-plate warming device. It should be understood that the device 10 may be used to warm many different types of foodstuff and should not be limited in use to only warming left-over food items.

Figure 3:
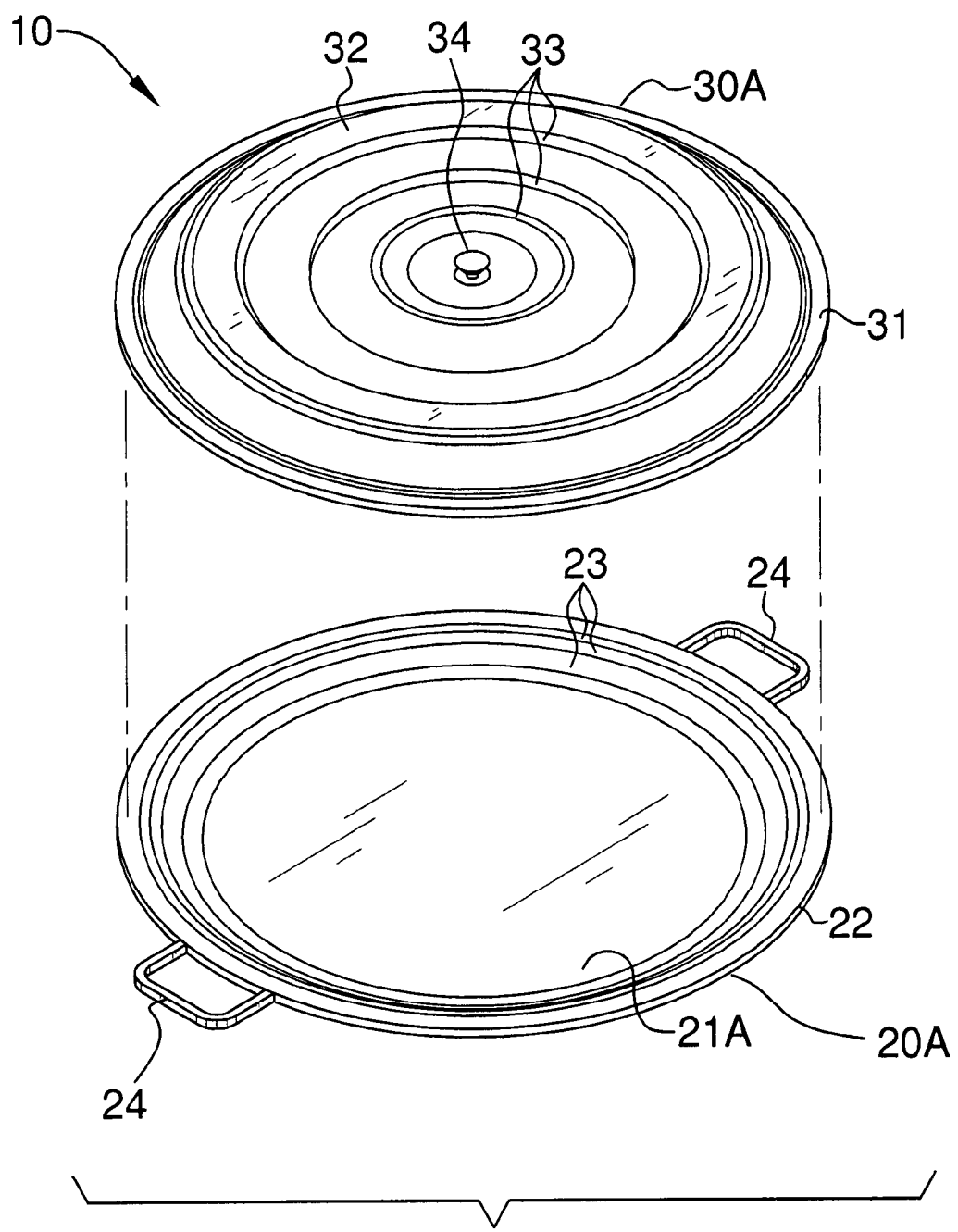
FIG. 3 is a perspective showing the base plate and cover plate shown in FIG. 2.
Figure 4:
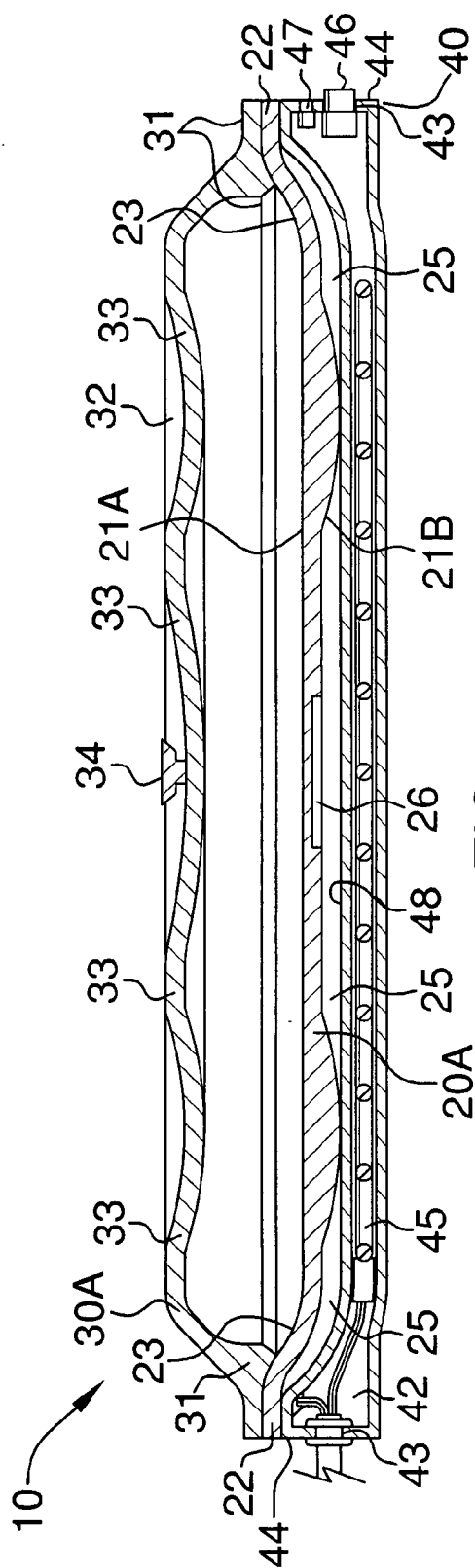
FIG. 4 is a cross-sectional view of the device shown in FIG. 1, taken along line 4-4.
Figure 5:
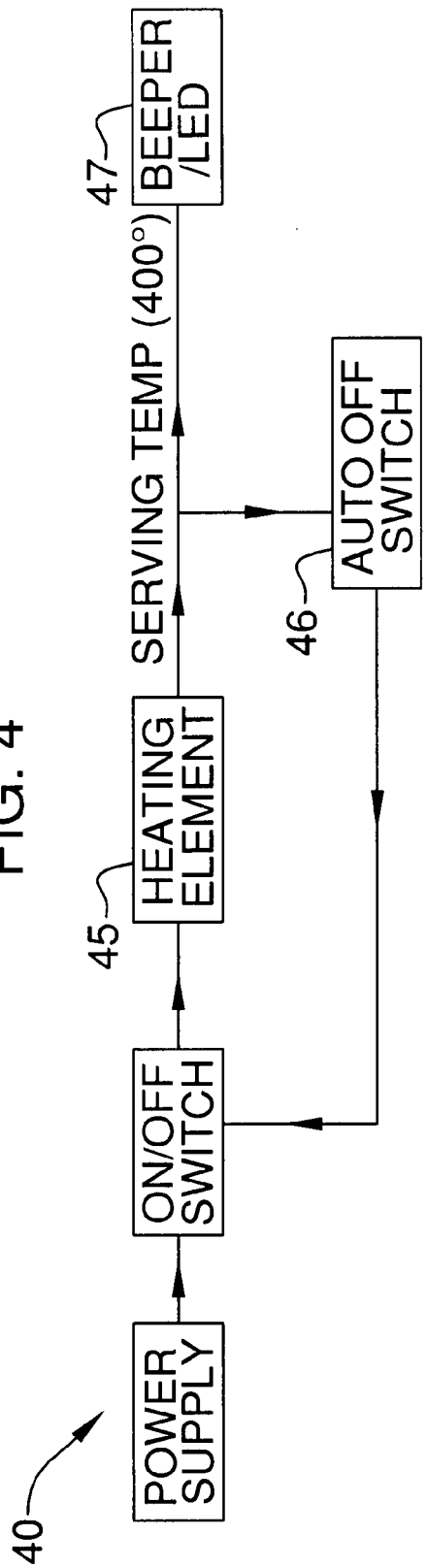
FIG. 5 is a schematic block diagram of the device shown in FIG. 1.
Figure 7:
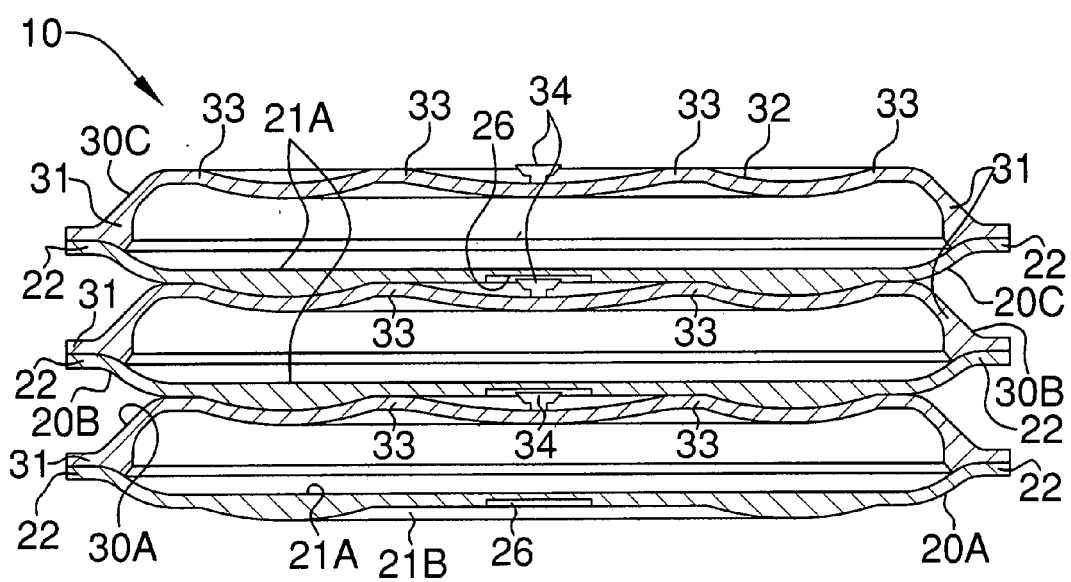
FIG. 7 is a cross-sectional view of the devices shown in FIG. 6, taken along line 7-7.

Referring initially to FIGS. 3, 4 and 7, the device 10 includes a first base 20 plate that has an annular shape provided with a planar top surface 21A. Such a base plate 20 further has an outwardly beveled edge 22 provided with a plurality of laterally stepped ridges 23 concentrically spaced from a center of the top surface 21A. The base plate 20 includes a plurality of handles 24 that are directly conjoined, without the use of intervening elements, to the outwardly beveled edge 22 and are diametrically spaced along an outer perimeter of the base plate 20. This is a critical and advantageous feature for allowing a user to simultaneously transport the base plate 20 and the cover plate 30 (described herein below) between remote locations, conveniently ensuring that the foodstuff stored within the device 10 is kept warm. Such handles 24 are suitably sized and shaped for receiving at least four contiguous metacarpals of the user therethrough, which is an essential and advantageous feature for allowing an arthritic person, who may have lost the gripping function provided by their thumb, to effectively lift and transport the device 10 by themselves. Thus, the device 10 affords such users with greater independence and may serve to increase their self-confidence.

Referring to FIGS. 1, 2, 3, 4, 6 and 7, a first cover plate 30 is directly positioned, without the use of intervening elements, on the base plate 20, which is vital for ensuring that heat generated by the heating mechanism 40 (described herein below) remains trapped between the base plate 20 and the cover plate 30. Such a cover plate 30 has an annular shape provided with an outer lip 31 that is directly nested, without the use of intervening elements, on top of an outer one of the stepped ridges 23, which is crucial such that heat and steam are advantageously and effectively prevented from escaping away from an interior of the warming device 10. The first base plate 20A bottom surface 21B and the first cover plate 30A top surface 32 have an oscillating pattern. Of course, the base plate 20 and the cover plate 30 may be produced in a variety of alternate shapes, sizes and colors, as is obvious to a person of ordinary skill in the art.

Referring to FIGS. 1, 2, 4 and 5, a mechanism 40 is included for heating the top surface 21A of the base plate 20 in such a manner that the food deposited on top of the base plate 20 and beneath the cover plate 30 can advantageously and effectively be heated after a predetermined time interval. Such a heating mechanism 40 includes an enclosed housing 41 that is removably abutted directly, without the use of intervening elements, against the bottom surface 21B of the base plate 20. The housing 41 has a cavity 42 formed therein and further has a plurality of access holes 43 formed at opposed ends 44 of the housing 41. A unitary and continuous heating element 45 is disposed within the cavity 42 such that the heating element 45 is invisible to and isolated from the user, which is advantageous and critical for increasing the safety with which device 10 is operated.

An automatic shut off switch 46 is electrically coupled to the heating element 45 that is vital for advantageously and conveniently interrupting power to the heating element 45 when an interior temperature of the warming device 10 reaches a maximum threshold temperature. A combined light source and sound emitting member 47 is electrically coupled to the heating element 45 and the automatic shut off switch 46, which is crucial for conveniently and effectively notifying a user when the device 10 has reached the maximum threshold temperature. A top surface 48 of the housing 41 and the bottom surface 21B of the base plate 20 define a plurality of gaps 25 therebetween that are essential and advantageous for effectively allowing heat to circulate along an entire surface area of the base plate 20 and for evenly distributing the heat therealong.

Figure 6:
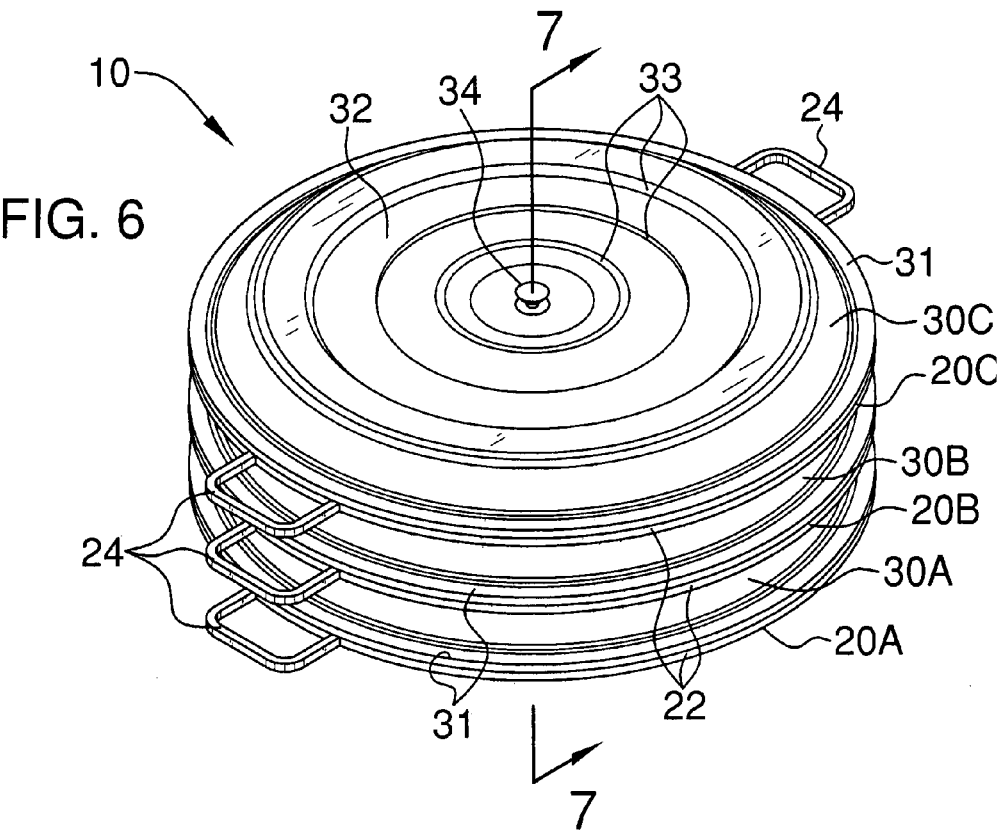
FIG. 6 is a perspective view showing the first, second, and third food and food-plate warming devices stacked one on top of another.

Referring to FIGS. 6 and 7, the device 10 further includes a second base plate 20B and a second cover plate 30B directly and removably conjoined, without the use of intervening elements, therewith. Such a second base plate 20B has a contoured and beveled bottom surface 21B. The first cover plate 30A has a contoured and beveled top surface 32 that has a symmetrically opposite and mirror shape of the second base plate bottom surface 21B respectively such that the second base plate 20B and the first cover plate 30A effectively become interlocked when vertically stacked on each other, thus advantageously allowing an individual to simultaneously transport more than one base plate 20 and cover plate 30 between remote locations.

Again referring to FIGS. 6 and 7, the device 10 also includes a third base plate 20C and a third cover plate 30C directly and removably conjoined, without the use of intervening elements, therewith. Such a third base plate 20C has a contoured and beveled bottom surface 21B. The second cover plate 30B has a contoured and beveled top surface 32 that has a symmetrically opposite and mirror shape of the third base plate bottom surface 21B respectively such that the third base plate 20C and the second cover plate 30B become interlocked when directly engaged, without the use of intervening elements, and adapted to a vertically stacked position.

Referring to FIGS. 1, 2, 3, 4, 6 and 7, the first 30A, second 30B and third 30C cover plates include a plurality of concentrically positioned annular ridges 33 centrally registered from a respective center of the first 30A, second 30B and third 30C cover plates. Each of the first 30A, second 30B and third 30C cover plates also include a knob 34 centrally conjoined thereto and protruding vertically upwards such that a longitudinal length of the knob 34 is oriented perpendicular to a respective one of the first 30A, second 30B and third 30C cover plates. Such knobs 34 advantageously provide a convenient means for lifting a cover plate 30 from its respective base plate 20. Each of the first 20A, second 20B and third 20C base plates are provided with a chamfered region defining a notch 26 that is suitably sized and shaped for conveniently and effectively receiving the knobs 34 therein when the first 20A, 30A, second 20B, 30B and third 20C, 30C base and cover plates are vertically stacked respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A combined food and food-plate warming device for assisting arthritic users to simultaneously heat refrigerated foodstuff seated on a cold plate, said combined food and food-plate warming device comprising:

a first base plate having an annular shape provided with a planar top surface, said base plate further having an outwardly beveled edge provided with a plurality of laterally stepped ridges concentrically spaced from a center of said top surface;

a first cover plate directly positioned on said base plate, said cover plate having an annular shape provided with an outer lip directly nested on top of an outer one of said stepped ridges such that heat and steam are prevented from escaping away from an interior of said warming device, said base plate including a plurality of handles directly conjoined to said outwardly beveled edge and diametrically spaced along an outer perimeter of said base plate, said handles being suitably sized and shaped for receiving at least four contiguous metacarpals of the user therethrough; and means for heating said top surface of said base plate in such a manner that the food and food-plate interfitted between said base plate and said cover plate can be effectively heated after a predetermined time interval;

a third base plate and a third cover plate directly and removably conjoined therewith, said third base plate having a contoured and beveled bottom surface, said second cover plate having a contoured and beveled top surface having a symmetrically opposite and mirror shape of said third base plate bottom surface respectively such that said third base plate and said second cover plate become interlocked when directly engaged and adapted to a vertically stacked position;

wherein each said first, second and third top plates comprise a knob centrally conjoined thereto and protruding vertically upwards such that a longitudinal length of said knob is oriented perpendicular to a respective one of said first, second and third top plates.

2. The device of claim 1, further comprising:

a second base plate and a second cover plate directly and removably conjoined therewith, said second base plate having a contoured and beveled bottom surface, said first cover plate having a contoured and beveled top surface having a symmetrically opposite and mirror shape of said second base plate bottom surface respectively such that said second base plate and said first cover plate become interlocked when vertically stacked on each other.

3. The device of claim 1, wherein said first, second and third top plates comprise: a plurality of concentrically positioned annular ridges centrally registered from a respective center of said first, second and third top plates.

4. The device of claim 1, wherein each said first, second and third base plates are provided with a chamfered region defining a notch suitably sized and shaped for receiving said knobs therein when said first, second and third base and cover plates are vertically stacked respectively.

5. A combined food and food-plate warming device for assisting arthritic users to simultaneously heat refrigerated foodstuff seated on a cold plate, said combined food and food-plate warming device comprising:

a first base plate having an annular shape provided with a planar top surface, said base plate further having an outwardly beveled edge provided with a plurality of laterally stepped ridges concentrically spaced from a center of said top surface;

a first cover plate directly positioned on said base plate, said cover plate having an annular shape provided with an outer lip directly nested on top of an outer one of said stepped ridges such that heat and steam are prevented from escaping away from an interior of said warming device, said base plate including a plurality of handles directly conjoined to said outwardly beveled edge and diametrically spaced along an outer perimeter of said base plate, said handles being suitably sized and shaped for receiving at least four contiguous metacarpals of the user therethrough, wherein said first base plate bottom surface and said first cover plate top surface have an oscillating pattern; and means for heating said top surface of said base plate in such a manner that the food and food-plate interfitted between said base plate and said cover plate can be effectively heated after a predetermined time interval;

a third base plate and a third cover plate directly and removably conjoined therewith, said third base plate having a contoured and beveled bottom surface, said second cover plate having a contoured and beveled top surface having a symmetrically opposite and mirror shape of said third base plate bottom surface respectively such that said third base plate and said second cover plate become interlocked when directly engaged and adapted to a vertically stacked position;

wherein each said first, second and third top plates comprise: a knob central conjoined thereto and protruding vertically upwards such that a longitudinal length of said knob is oriented perpendicular to a respective one of said first, second and third ton plates.

6. The device of claim 5, further comprising:

a second base plate and a second cover plate directly and removably conjoined therewith, said second base plate having a contoured and beveled bottom surface, said first cover plate having a contoured and beveled top surface having a symmetrically opposite and mirror shape of said second base plate bottom surface respectively such that said second base plate and said first cover plate become interlocked when vertically stacked on each other.

7. The device of claim 5, wherein said first, second and third top plates comprise: a plurality of concentrically positioned annular ridges centrally registered from a respective center of said first, second and third top plates.

8. The device of claim 5, wherein each said first, second and third base plates are provided with a chamfered region defining a notch suitably sized and shaped for receiving said knobs therein when said first, second and third base and cover plates are vertically stacked respectively.

9. A combined food and food-plate warming device for assisting arthritic users to simultaneously heat refrigerated foodstuff seated on a cold plate, said combined food and food-plate warming device comprising:

a first base plate having an annular shape provided with a planar top surface, said base plate further having an outwardly beveled edge provided with a plurality of laterally stepped ridges concentrically spaced from a center of said top surface;

a first cover plate directly positioned on said base plate, said cover plate having an annular shape provided with an outer lip directly nested on top of an outer one of said stepped ridges such that heat and steam are prevented from escaping away from an interior of said warming device, said base plate including a plurality of handles directly conjoined to said outwardly beveled edge and diametrically spaced along an outer perimeter of said base plate, said handles being suitably sized and shaped for receiving at least four contiguous metacarpals of the user therethrough, wherein said first base plate bottom surface and said first cover plate top surface have an oscillating pattern; and means for heating said top surface of said base plate in such a manner that the food and food-plate interfitted between said base plate and said cover plate can be effectively heated after a predetermined time interval, wherein said heating means comprises:

an enclosed housing removably abutted directly against said bottom surface of said base plate, said housing having a cavity formed therein and further having a plurality of access holes formed at opposed ends of said housing;

a unitary and continuous heating element disposed within said cavity such that said heating element is invisible to the user; and an automatic shut off switch electrically coupled to said heating element for interrupting power to said heating element when an interior temperature of said warming device reaches a maximum threshold temperature;

wherein a top surface of said housing and said bottom surface of said base plate define a plurality of gaps therebetween for allowing heat to circulate along an entire surface area of said base plate and evenly distribute heat therealong;

a third base plate and a third cover plate directly and removably conjoined therewith, said third base plate having a contoured and beveled bottom surface, said second cover plate having a contoured and beveled top surface having a symmetrically opposite and mirror shape of said third base plate bottom surface respectively such that said third base plate and said second cover plate become interlocked when directly engaged and adapted to a vertically stacked position;

wherein each said first, second and third top plates comprise: a knob centrally conjoined thereto and protruding vertically upwards such that a longitudinal length of said knob is oriented perpendicular to a respective one of said first, second and third top plates.

10. The device of claim 9, further comprising:

a second base plate and a second cover plate directly and removably conjoined therewith, said second base plate having a contoured and beveled bottom surface, said first cover plate having a contoured and beveled top surface having a symmetrically opposite and mirror shape of said second base plate bottom surface respectively such that said second base plate and said first cover plate become interlocked when vertically stacked on each other.

11. The device of claim 9, wherein said first, second and third top plates comprise: a plurality of concentrically positioned annular ridges centrally registered from a respective center of said first, second and third top plates.

12. The device of claim 9, wherein each said first, second and third base plates are provided with a chamfered region defining a notch suitably sized and shaped for receiving said knobs therein when said first, second and third base and cover plates are vertically stacked respectively.

* * * * *